United States Patent [19]
Malott

[11] Patent Number: 4,463,956
[45] Date of Patent: Aug. 7, 1984

[54] SHIELD FOR LABYRINTH SEAL
[75] Inventor: Richard C. Malott, Indianapolis, Ind.
[73] Assignee: General Motors Corporation, Detroit, Mich.
[21] Appl. No.: 515,693
[22] Filed: Jul. 21, 1983
[51] Int. Cl.³ .................. F16J 15/44; F01D 25/18
[52] U.S. Cl. .................. 277/12; 277/53; 277/203; 415/170 R; 415/175
[58] Field of Search ............ 277/12, 32, 53, 55–57, 277/203; 415/170 R, 170 A, 170 B, 172 R, 172 A, 174, 175

[56] References Cited
U.S. PATENT DOCUMENTS

| | | |
|---|---|---|
| 3,131,007 | 4/1964 | Steel et al. |
| 3,162,451 | 12/1964 | Brose ................................. 277/53 |
| 3,173,696 | 3/1965 | Reinhardt et al. ............... 277/53 |
| 3,264,043 | 8/1966 | Keen . |
| 3,360,313 | 12/1967 | Pratt et al. . |
| 3,833,273 | 9/1974 | Rickley et al. ................ 277/56 X |
| 3,903,690 | 9/1975 | Jones ............................... 415/175 X |
| 3,989,410 | 11/1976 | Ferrari ......................... 415/172 A X |
| 4,103,899 | 8/1978 | Turner ............................ 415/175 X |
| 4,245,951 | 1/1981 | Minnich ..................... 415/170 R X |

Primary Examiner—Robert S. Ward
Attorney, Agent, or Firm—Saul Schwartz

[57] ABSTRACT

A shield for disposition between a lubricated bearing and a labyrinth seal in a gas turbine engine having a rotating member rotatable about a vertical axis, the shield preventing lubricant contamination of the seal. The shield includes an inner helical baffle on the rotating member between the bearing and the seal and an outer helical baffle on a stationary support between the inner baffle and the seal. The inner and outer baffles radially overlap to foreclose lubricant drip onto the seal and have corresponding helical leads so that the inner baffle can be threaded through the outer baffle when the rotating member is installed on the support.

3 Claims, 3 Drawing Figures

SHIELD FOR LABYRINTH SEAL

BACKGROUND OF THE INVENTION

1. Field of the Invention

This invention relates generally to labyrinth seals in gas turbine engines and, more particularly, to a new and improved shield for preventing lubricant contamination of a labyrinth seal in an engine having vertical and horizontal operating modes.

2. Description of the Prior Art

In a proposed vertical take-off and landing aircraft, gas turbine engines mounted at the ends of the wings power rotors which propel the aircraft in both a cruise mode and in an ascent/descent mode. In the cruise mode the engines are oriented horizontally and in the ascent/descent mode the engines are oriented vertically. During transition between the two modes the engines pivot about a transverse axis of the aircraft. Within the gas turbine engines, labyrinth seals are employed in their usual fashion to control the flow of gases and must be shielded from dripping lubricant when the engine is oriented vertically. For example, where a shaft has a lubricated bearing inboard or forward of a labyrinth seal, a shield must be arranged between the bearing and the seal to avoid lubricant contamination of the seal. In applications involving shafts located centrally in engines, further considerations include the sequence in which the various parts are to be assembled and the clearances necessary to permit assembly while still insuring adequate shield operation. In the past, bearing and seal arrangements for vertically oriented engines have been proposed in which the downward flow of lubricant from the bearing is channeled in particular directions either to recover the lubricant or to avoid labyrinth seals. These proposals, however, lack suitability for the environment in which a shield according to this invention finds utility.

SUMMARY OF THE INVENTION

Accordingly, the primary feature of this invention is that it provides a new and improved shield for a labyrinth seal in a gas turbine engine having a vertical operating mode. Another feature of this invention is that it provides a new and improved shield particularly suited for disposition between an inboard lubricated bearing around a centrally located shaft and an outboard labyrinth seal between the shaft and a relatively stationary portion of the engine. Still another feature of this invention resides in the provision in the new and improved shield of an inner baffle on the shaft between the bearing and the labyrinth seal and an outer baffle on the stationary member between the inner baffle and the labyrinth seal, the inner baffle being assembled with the shaft on the engine after the outer baffle but radially overlapping the latter to foreclose lubricant flow along the shaft from the bearing to the labyrinth seal. Yet another feature of this invention resides in the provision in the new and improved shield of an inner baffle in the form of a helical flange having a predetermined lead and a length sufficient to provide in excess of one full pitch and in the provision of an outer baffle in the form of a helical flange having the same lead as the inner baffle and a length sufficient to provide in excess of one full pitch, the inner baffle being positioned inboard of the outer baffle by threading through the latter as the shaft is advanced to an assembled position in the engine. These and other features of this invention will be readily apparent from the following specification and from the drawings wherein:

Figure 1:
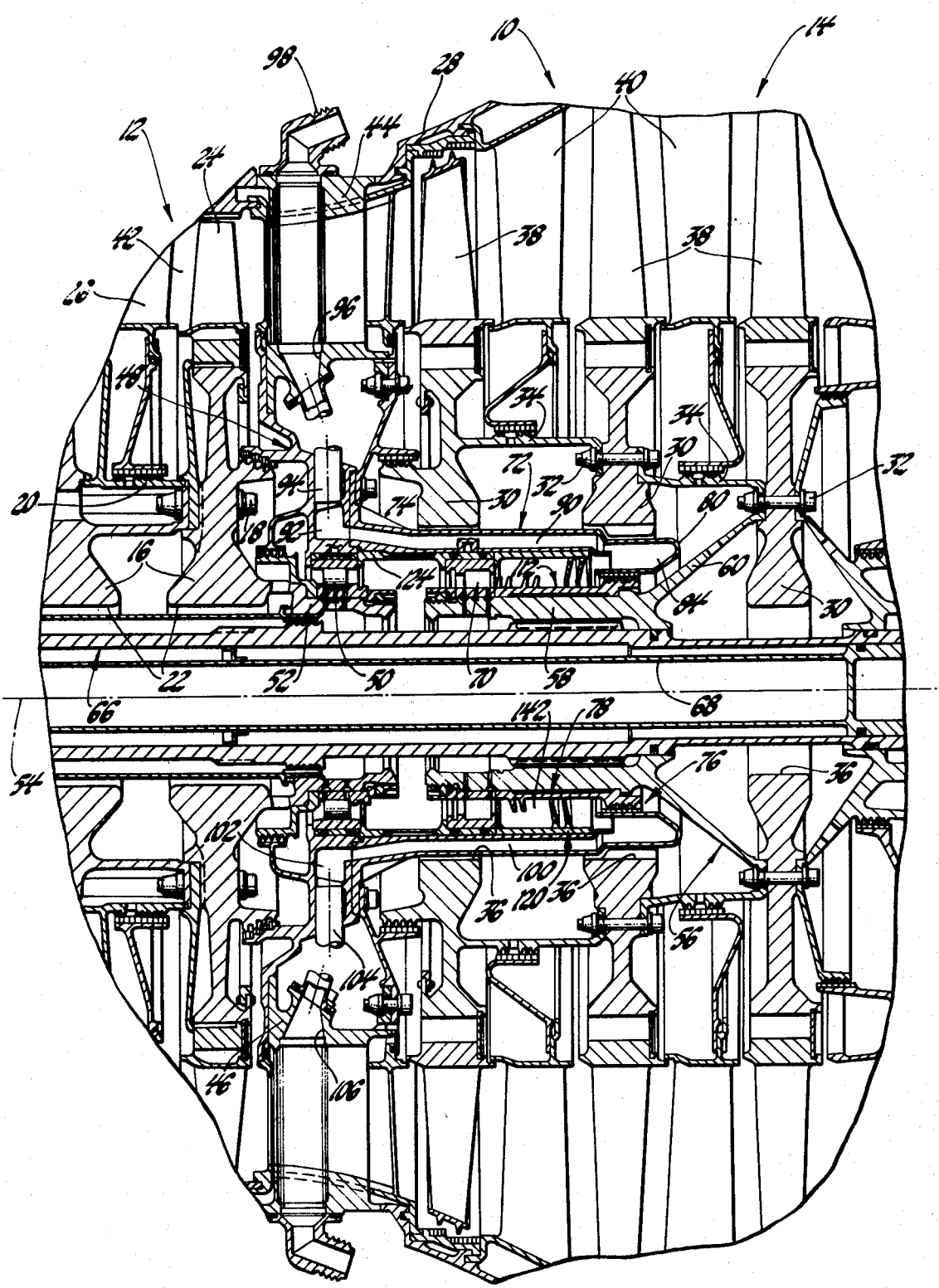
FIG. 1 is a longitudinal sectional view of a portion of a gas turbine engine having a new and improved shield according to this invention.

Describing, first, the environment in which the shield according to this invention finds particular utility, FIG. 1 illustrates only as much of the internal structure of a gas turbine engine as is necessary for an understanding of the invention. More particularly, an axial flow turbine section 10 of the gas turbine engine includes a gasifier turbine assembly 12 and a power turbine assembly 14. The gasifier turbine assembly includes a pair of turbine wheels 16 rigidly connected, as by an annular array of fasteners 18, with a spacer 20 therebetween. Each of the wheels 16 has a central bore 22 therethrough and carries at its periphery turbine blades which form a pair of blade stages 24. A stage 26 of stator vanes is supported on a stationary or casing portion 28 of the engine between the turbine blade stages 24. The power turbine assembly 14 includes three wheels 30 rigidly coupled by a plurality of annular arrays of fasteners 32 with a pair of spacers 34 therebetween. Each of the wheels 30 has a central bore 36 therethrough and carries at its periphery turbine blades which form three blade stages 38. A pair of stator vane stages 40 are disposed between the turbine blade stages 38 and are rigidly attached to the casing portion 28 of the engine. Platforms on the turbine blades and on the stator vanes cooperate in defining an axially extending motive fluid flow path 42 which extends downstream, left to right in FIG. 1, from a nozzle, not shown, ahead of the first blade stage 24 to an exhaust downstream of the last blade stage 38.

Between the aftermost gasifier blade stage 24 and the forwardmost power blade stage 38 is situated another stage of stator vanes, not shown, which direct the motive fluid across the gap between the gasifier turbine assembly 12 and the power turbine assembly 14. In the same gap are also located a plurality of symmetrically angularly spaced struts which project radially inward from the casing portion 28 across the motive fluid flow path 42 only a pair of diametrically disposed struts 44 and 46 being shown in FIG. 1. Radially inboard of the motive fluid flow path 42 the struts are attached to an inner bearing support 48 which is, thus, rigidly connected to the casing portion 28. A first roller bearing assembly 50 is disposed between an extension 52 of the gasifier turbine assembly 12 and the bearing support 48 and supports the aft or rearward end of the gasifier turbine assembly on the casing portion 28 of the engine for rotation about a longitudinal axis 54 of the engine.

The power turbine assembly 14 includes a forwardly extending flange 56 rigidly attached to the aft turbine wheel 30 at the array of fasteners 32. The flange 56 includes a cylinder portion 58 and an integral bell-shaped portion 60 connected to the gasifier turbine assembly 12. A plurality of internal splines 62 on the cylinder portion 58 engage a corresponding plurality of external splines 64 on a power shaft 66 aligned on longitudinal axis 54 of the engine. The turbine flange 56 thereby transfers torque from the power turbine assembly to the power shaft 66. A torque meter tube 68 is disposed within the power shaft 66 and operates in known manner to monitor the torque being transmitted by the power shaft during engine operation.

A second roller bearing assembly 70 is disposed between the turbine flange 56 and an axially extending cylinder 72 attached to the bearing support 48 by an annular array of fasteners 74. The second bearing assembly 70 thus supports the gasifier turbine assembly on the casing portion for rotation about the axis 54 of the engine. A labyrinth seal assembly 76 seals between the cylinder 72 and turbine flange 56 outboard or aft of the second bearing assembly 70. A shield according to this invention and designated generally 78 is disposed between the second bearing assembly 70 and the labyrinth seal 76 to prevent lubricant contamination of the latter.

Figure 2:
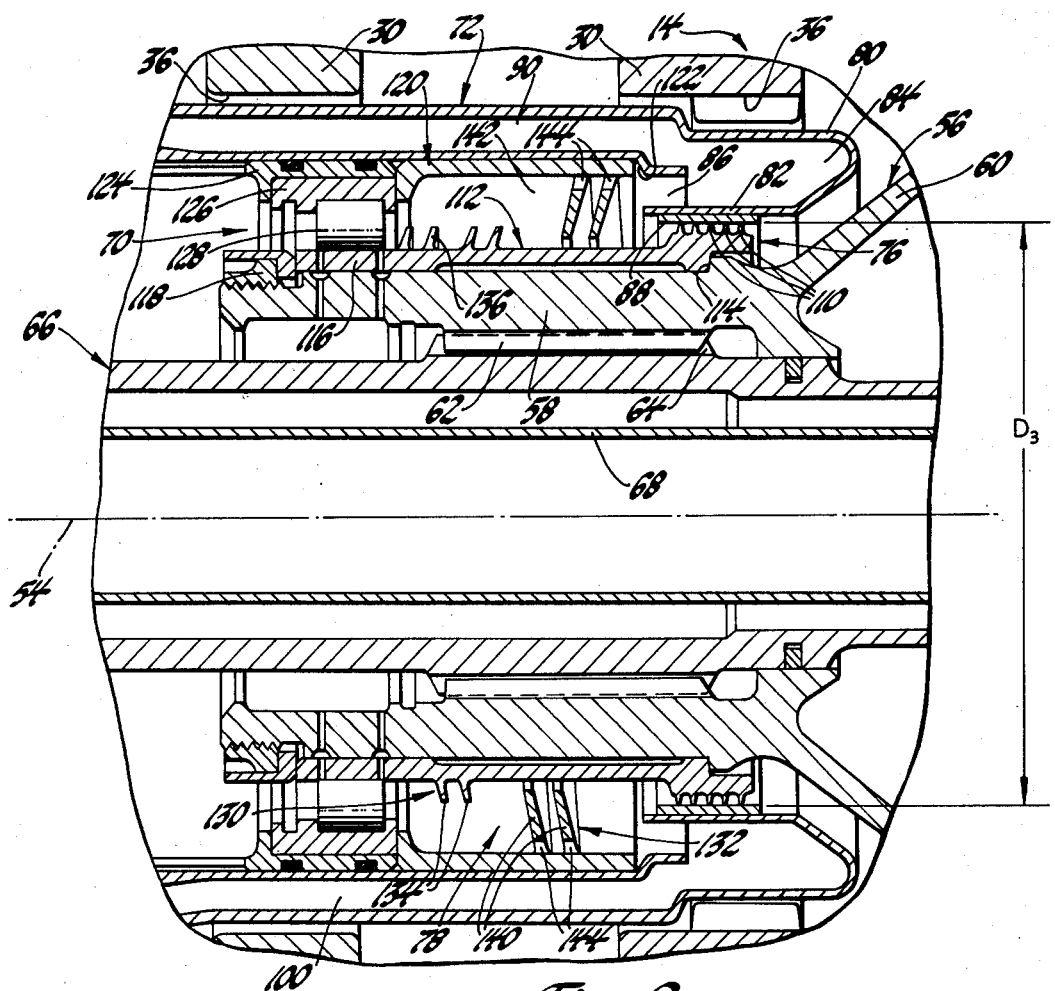
FIG. 2 is an enlarged view of a portion of FIG. 1 showing the new and improved shield according to this invention.

Referring particularly now to FIG. 2, the cylinder 72 has a rearwardly extending annular flange 80 including an inner cylindrical lip 82 aligned on axis 54. The annular flange 80 defines a trough 84 aft of an annulus 86 between lip 82 and the cylinder 72 while the opposite side of the lip 82 supports a stationary abradable portion 88 of the labyrinth seal 76. A passage 90 in the cylinder 72 opens into the trough 84 and is connected with a cavity 92 in the bearing support 48, FIG. 1. A tube 94, shown out of position in FIG. 1, is connected to the cavity and to a passage 96 through the strut 44 and, by means of a fitting 98 outboard of the casing portion 28, and a conduit, not shown, to a vented area of the engine assembly such as a reduction gear box so that the trough 84 is vented to atmosphere. A second passage 100 in the cylinder 72 also communicates with the trough 84 and with another cavity 102 in the bearing support 48, FIG. 1. A tube 104, shown out of position in FIG. 1, is connected to the cavity 102 and to a passage 106 through the strut 46 and, by means of a fitting 108 outboard of the casing portion 28 and a conduit, not shown, to the inlet side of a scavenge pump which operates concurrently with the engine. The scavenge pump removes lubricant from the trough 84 through passage 100, cavity 102, tubes 104 and passage 106.

With continued reference to FIG. 2, the labyrinth seal 76 also includes a plurality of annular ribs 110 on an inner sleeve 112 which engage the abradeable material portion 88 on the lip 82 of the flange 80. The inner sleeve 112 is disposed on the cylinder portion 58 of the turbine flange 56 and abuts a shoulder 114 on the latter. A sleeve segment 116 is similarly disposed on the cylinder portion 58 ahead of the inner sleeve 112 and is captured between the inner sleeve and a retainer 118 threaded on the end of the cylinder portion 58. The sleeve segment 116 defines the inner race of the bearing assembly 70.

Referring again to FIG. 2, an outer sleeve 120 is disposed inside the cylinder 72 and abuts an inner annular shoulder 122 on the latter. The outer sleeve is captured between the shoulder 122 and a spacer 124 on which an outer race 126 of the bearing assembly 70 is supported. A plurality of rollers 128 between the outer race 126 and the sleeve segment 116 complete the bearing assembly 70. The spacer 124 extends forwardly to the first bearing assembly 50 and is captured thereby so that the outer race 126 and the outer sleeve 120 are held in position on the cylinder 72. Lubrication means, not shown, are provided radially inboard of the support 48 and the cylinder 72 between the first bearing assembly 50 and the second bearing assembly 70 to lubricate the bearings during operation.

Figure 3:
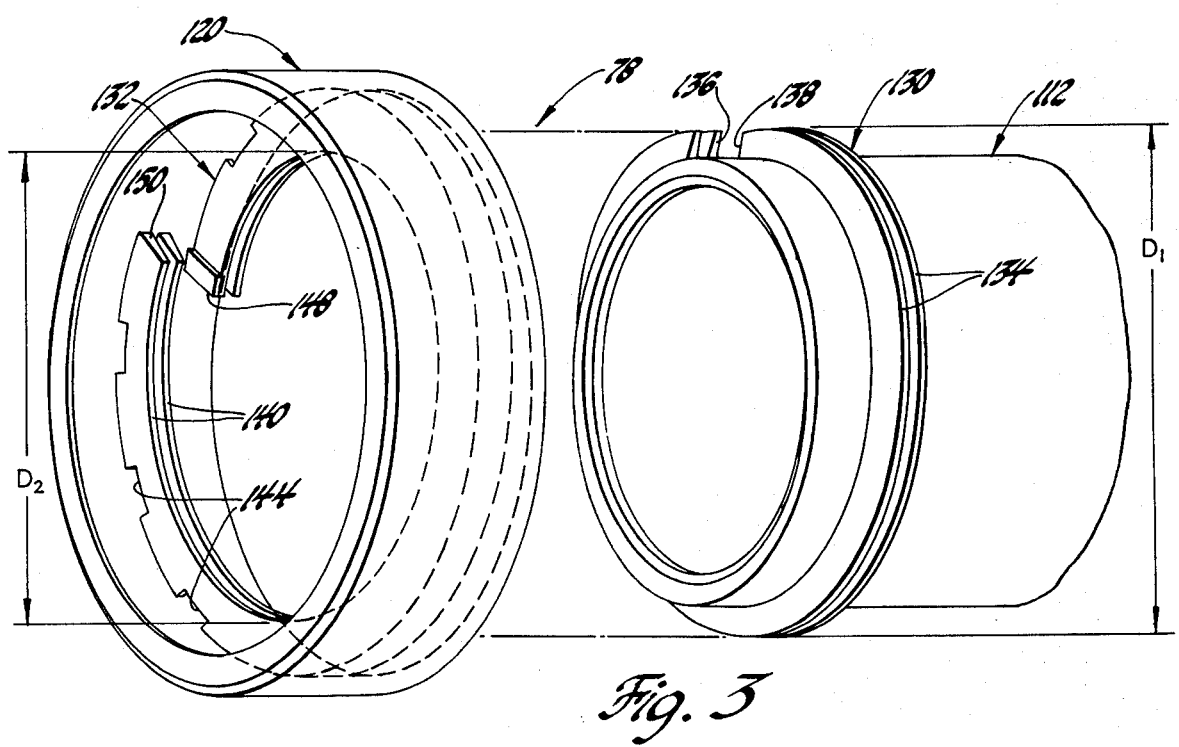
FIG. 3 is an exploded perspective view of the new and improved shield according to this invention.

With particular reference now to FIGS. 2 and 3, the shield 78 according to this invention includes an inner helical baffle 130 on the inner sleeve 112 and on outer helical baffle 132 on the outer sleeve 120. The inner baffle 130 includes a pair of spaced parallel flanges 134 integral with or rigidly attached to the inner sleeve 112 and projecting radially outwardly and rearwardly. The inner helical baffle 130 has a predetermined pitch and its length is determined to provide an overlap between a first edge 136 and a second edge 138 of the flange, that length being at least sufficient to define one full helical pitch of the baffle so that when viewed axially the inner baffle completely encircles the inner sleeve 112. Similarly, the outer helical baffle 132 has the same pitch as inner baffle 130 and includes a pair of spaced parallel flanges 140 which project radially inwardly and forwardly from the outer sleeve 120. The outer baffle 132 cooperates with the outer sleeve 120 in defining an annular trough 142 at the intersection between the outer sleeve and the outer baffle. A circumferential array of apertures 144 in the flanges 140 allow drainage of the trough 142 while a lip 146 adjacent a rearward edge 148 of the baffle prevents fluid leakage over the edge. The length of the outer baffle 132 is sufficient to provide overlap between a forward edge 150 of the baffle and the edge 148 so that the outer baffle defines at least one full helical pitch, and, when viewed axially defines a complete annulus inside the outer sleeve 120. The inner baffle 130 has an outer diameter $D_1$, FIG. 3, which exceeds the inner diameter $D_2$, FIG. 3, of the outer helical baffle 132 so that the inner baffle radially overlaps the outer baffle. In addition, the diameter $D_3$, FIG. 2, defined by the abradable material portion 88 of the labyrinth seal 76 generally equals or slightly exceeds diameter $D_1$ of the inner baffle 130.

Describing now that portion of the engine assembly procedure involving the shield 78, the power turbine assembly 14 including turbine flange 56, sleeve segment 116 and inner sleeve 112 are subassembled remote from the casing portion 28 and then installed as a unit after the cylinder 72, first bearing assembly 50 and outer sleeve 120 have been installed. The turbine flange 56 is aligned on the axis 54 and the power turbine assembly is moved forward, leftward in FIG. 1, to bring the sleeve segment 116 and the inner baffle 130 inside the abradeable material portion 88 of the labyrinth seal 76. Because of the radial overlap between the inner and outer baffles 130 and 132, respectively, the turbine flange 56 cannot directly advance all the way to its assembled position, FIG. 1. Advancement can be continued, however, by rotating the power turbine assembly and advancing the same as the inner baffle 130 threads through the outer baffle 132. In the embodiment shown in the drawings, because the inner and outer helical baffles each have a length corresponding generally to one pitch, it takes approximately one complete revolution of the power turbine assembly to thread the inner baffle completely through the outer baffle. Following passage of the inner baffle through the outer baffle the power turbine assembly is further directly advanced until the sleeve segment 116 underlies the rollers 128 of the bearing assembly 70 whereupon the fully installed position of the power turbine assembly is achieved and maintained by conventional means, not shown. Disassembly, of course, requires reversal of the recited procedure.

With respect now to operation of the shield 78 in a cruise mode of the gas turbine engine, the latter is already oriented horizontally and delivering power to the rotor through the power shaft 66 in conventional fashion. During such operation lubricant is dispersed onto the bearing assembly 70 and at least partially passes through the bearing assembly onto the inner helical baffle 130. Because the inner baffle slants rearwardly and radially outwardly and is rotating at high speed with the power shaft 66 the baffle acts as a slinger causing the lubricant to be thrown radially outward against the outer sleeve 120. Because the displaced lubricant also has an axial component of motion it tends to flow rearwardly through the apertures 144 in the flanges 140 and then through the annulus 86 into the trough 84. Any lubricant which finds its way into the trough 84 is scavenged by the constantly operating scavenge pump, not shown, through passage 100 as described hereinbefore.

As the engine transitions in either direction between the cruise mode and the ascent/descent mode, the axis 54 moves between the horizontal attitude illustrated in the drawings and a vertical attitude, not shown. During engine operation, as the axis transitions from horizontal to vertical more and more lubricant contacts the inner helical baffle 130 and is thrown thereby against the outer sleeve 120 to be carried into the trough 84 as described hereinbefore.

Following a descent, engine operation may be terminated with the axis 54 vertical in preparation for a succeeding ascent. After engine shut down, residual lubricant axially inboard of the bearing assembly 70 tends to drain downward along the inner sleeve 112 and would, unless diverted, contaminate the labyrinth seal 76. The lubricant, however, first encounters inner baffle 130 which directs the fluid radially outwardly over its own outer edge. Because the first and second edges 136 and 138 of the inner baffle overlap, there is no point around the inner sleeve 112 where lubricant can drip along the sleeve. Because the inner and outer baffles radially overlap, all lubricant dripping from the inner baffle is caught on top of the outer baffle and directed radially outwardly into the trough 142. Under the influence of gravity, the lubricant in the trough 142 drains through the apertures 144 and the annulus 86 into the trough 84 where it remains until a subsequent engine ignition. When the engine is restarted the residual lubricant thus trapped is scavenged through the passage 100 by the scavenged pump as described hereinbefore.

The embodiments of the invention in which an exclusive property or privilege is claimed are defined as follows:

1. In a gas turbine engine having a rotating member rotatable about a vertical axis, a support, a lubricated bearing between said rotating member and said support, and a labyrinth seal axially outboard of said bearing between said support and said rotating member including an element defining a minimum diameter for passage of said rotating member, a shield comprising, an inner helical baffle on said rotating member disposed between said bearing and said labyrinth seal in an assembled position of said rotating member, said inner baffle having a preselected lead and an outside diameter less than said minimum diameter and a length sufficient to define at least one full pitch, and an outer helical baffle on said support disposed between said inner baffle and said labyrinth seal in said assembled position of said rotating member, said outer baffle having said preselected lead so that said inner baffle can be threaded therethrough and an inside diameter less than said outside diameter of said inner baffle and a length sufficient to define at least one full pitch so that said inner and said outer baffles cooperate in shielding said labyrinth seal against vertical lubricant drip from said bearing through 360°.

2. The shield recited in claim 1 further including means on said support and on said outer baffle operative to trap lubricant dripped on said outer baffle, and drain means on said support operative to channel said trapped lubricant away from said outer baffle and from said labyrinth seal.

3. In a gas turbine engine having a rotating member rotatable about a vertical axis, a support, a lubricated bearing between said rotating member and said support, and a labyrinth seal axially outboard of said bearing between said support and said rotating member including an element defining a minimum diameter for passage of said rotating member, a shield comprising, an inner helical baffle on said rotating member disposed between said bearing and said labyrinth seal in an assembled position of said rotating member and defining a surface projecting radially outward and axially rearward in said assembled position of said rotating member operative to direct lubricant dripped vertically from said bearing radially outward, said inner baffle having a preselected lead and an outside diameter less than said minimum diameter and a length sufficient to define at least one full pitch, an outer helical baffle on said support disposed between said inner baffle and said labyrinth seal in said assembled position of said rotating member and defining a surface projecting radially inward and axially forward to form with said support a trough for trapping lubricant dripped from said inner baffle, said outer baffle having said preselected lead so that said inner baffle can be threaded therethrough and an inside diameter less than said outside diameter of said inner baffle and a length sufficient to define at least one full pitch so that said inner and said outer baffles cooperate in shielding said labyrinth seal against vertical lubricant drip from said bearing through 360°, means defining a lip at a rearward edge of said outer baffle to prevent passage of lubricant over said rearward edge, means defining a plurality of drain apertures through said outer baffle operative to drain lubricant trapped in said trough, and passage means on said support operative to direct lubricant from said drain apertures away from said outer baffle and from said labyrinth seal.

* * * * *